(12) United States Patent
Nakazawa et al.

(10) Patent No.: US 7,965,003 B2
(45) Date of Patent: Jun. 21, 2011

(54) MOTOR DRIVE SYSTEM FOR RAILWAY VEHICLE

(75) Inventors: Yosuke Nakazawa, Tokyo (JP); Shinichi Noda, Kanagawa (JP); Kazuaki Yuuki, Saitama (JP); Kazuaki Fukuda, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 274 days.

(21) Appl. No.: 11/958,823

(22) Filed: Dec. 18, 2007

(65) Prior Publication Data

US 2008/0179999 A1 Jul. 31, 2008

(30) Foreign Application Priority Data

Jan. 25, 2007 (JP) ................... 2007-015254

(51) Int. Cl.
*H02K 11/00* (2006.01)
*H02K 11/04* (2006.01)
*H02K 19/36* (2006.01)

(52) U.S. Cl. ............ 310/68 D; 310/58; 310/52; 310/89; 318/4; 318/53; 363/141; 307/43

(58) Field of Classification Search ............... 310/68 D, 310/68 R, 52–59, 89; 363/141; 318/4, 53; 307/43, 58; *H02K 11/00, 11/04, 19/36*
See application file for complete search history.

(56) References Cited

U.S. PATENT DOCUMENTS

| | | | |
|---|---|---|---|
| 3,324,368 A * | 6/1967 | Von Delden | 318/778 |
| 4,963,778 A * | 10/1990 | Jensen et al. | 310/68 D |
| 4,965,710 A * | 10/1990 | Pelly et al. | 363/56.03 |
| 5,365,132 A * | 11/1994 | Hann et al. | 310/58 |
| 5,552,976 A * | 9/1996 | Munro et al. | 363/39 |
| 5,925,947 A * | 7/1999 | Kajiwara et al. | 310/64 |
| 6,229,232 B1 | 5/2001 | Roth-Stielow et al. | |
| 6,930,417 B2 * | 8/2005 | Kaneko et al. | 310/58 |
| 7,009,318 B2 * | 3/2006 | Iritani et al. | 310/58 |
| 7,049,716 B2 * | 5/2006 | Grundl et al. | 310/52 |
| 7,122,928 B2 * | 10/2006 | Shindo | 310/89 |
| 7,485,987 B2 * | 2/2009 | Mori et al. | 307/63 |
| 2003/0173850 A1 | 9/2003 | Beyer et al. | |
| 2004/0164625 A1 * | 8/2004 | Grundl et al. | 310/16 |
| 2005/0052144 A1 | 3/2005 | Matsubara et al. | |
| 2005/0083716 A1 * | 4/2005 | Marquardt | 363/132 |
| 2006/0028075 A1 * | 2/2006 | Noda et al. | 310/64 |
| 2006/0097595 A1 * | 5/2006 | Randriamanantena | 310/156.08 |
| 2006/0284498 A1 * | 12/2006 | Piper et al. | 310/63 |

(Continued)

FOREIGN PATENT DOCUMENTS

CN 1595789 A 3/2005

(Continued)

OTHER PUBLICATIONS

U.S. Appl. No. 12/914,124, filed Oct. 28, 2010, Koyama, et al.

*Primary Examiner* — Quyen Leung
*Assistant Examiner* — John K Kim
(74) *Attorney, Agent, or Firm* — Oblon, Spivak, McClelland, Maier & Neustadt, L.L.P.

(57) ABSTRACT

A motor drive system 10-1 for a railway vehicle is capable of reducing the weight of wiring, electromagnetic noise, and manufacturing cost. The motor drive system includes an inverter 11. The inverter is configured to control a motor 13-1 and is divided into at least two separate inverter units that are arranged integrally with the motor.

2 Claims, 8 Drawing Sheets

U.S. PATENT DOCUMENTS

2007/0273220 A1 11/2007 Koyama et al.
2008/0179999 A1* 7/2008 Nakazawa et al. .......... 310/68 D

FOREIGN PATENT DOCUMENTS

| EP | 0 370 207 A1 | 5/1990 |
| EP | 1 237 260 A2 | 9/2002 |
| EP | 1 422 811 | 5/2004 |
| EP | 1 515 425 A2 | 3/2005 |
| JP | 2000-308388 | 11/2000 |
| JP | 3594100 | 9/2004 |
| WO | WO 02/095903 | 11/2002 |

* cited by examiner

MOTOR DRIVE SYSTEM FOR RAILWAY VEHICLE

CROSS REFERENCE TO RELATED APPLICATION

The present application claims the benefit of priority under 35 U.S.C. §119 to Japanese Patent Application No. 2007-015254, filed on Jan. 25, 2007, the entire contents of which are incorporated herein by reference.

BACKGROUND OF THE INVENTION

1. Field of the Invention

The present invention relates to a motor drive system for a railway vehicle.

2. Description of Related Art

Figure 1:
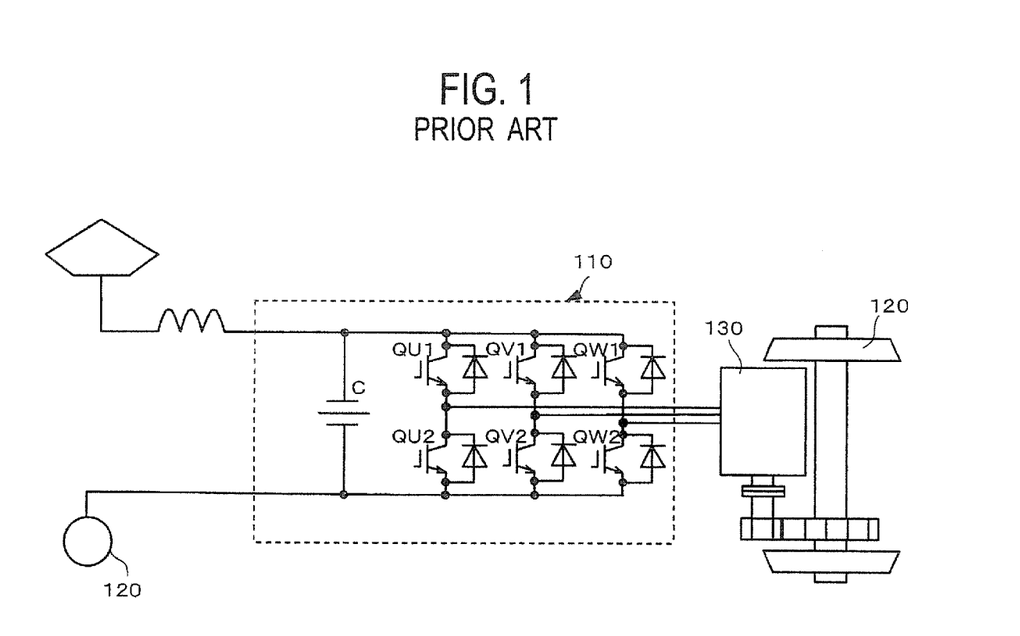
FIG. 1 is a circuit diagram showing a motor drive system for a railway vehicle according to a related art.
Figure 2:
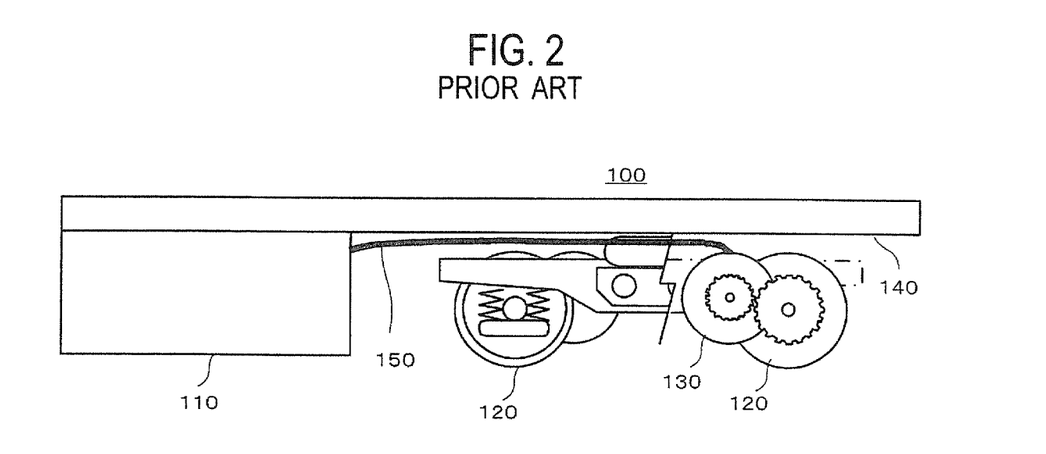
FIG. 2 is a view showing an arrangement of components of the motor drive system according to the related art.

Examples of motor drive systems for railway vehicles are disclosed in Japanese Unexamined Patent Application Publication No. 2000-308388, Japanese Patent Publication No. 3594100, and the like. FIG. 1 is a circuit diagram showing a motor drive system 100 for a railway vehicle according to a related art. FIG. 2 shows an inverter 110 of the motor drive system 100, wheels 120, a motor 130, and the like arranged in the railway vehicle of FIG. 1.

To make the motor 130 free of maintenance, the motor drive system 100 of the related art employs, as the motor 130, an AC motor such as an induction motor or a permanent-magnet synchronous motor. The motor 130 is connected to and driven by the inverter 110. The inverter 110 is installed under a vehicle floor 140 and is connected to the motor 130 through electric wiring 150 laid along the vehicle floor 140. In these years, inverters widely employ high-performance semiconductor switching elements such as IGBTs (Insulated Gate Bipolar Transistors) that withstand high voltages, e.g. 3300 V and achieve high-speed switching.

To improve the acceleration of a railway vehicle, a large current for driving a high-output motor is needed. To pass such a large current, wiring laid between the motor and the inverter will become heavier. High-speed switching of an inverter produces current harmonics, which are passed from the inverter to a motor through long wiring. The current harmonics passed through long wiring cause electromagnetic noise that may cause malfunctions of railway signals. It is preferable, therefore, to minimize the length of the wiring between the inverter and the motor. The inverter, however, is generally bulky, and therefore, there are limits on arranging the inverter as close to the motor as possible to shorten the wiring.

Semiconductor switching elements of high withstand voltage used for railway inverters are special-purpose products that are costly to manufacture. There is, therefore, a need of a motor drive system for a railway vehicle that is manufacturable at low cost to realize economical railway transportation.

SUMMARY OF THE INVENTION

An object of the present invention is to provide a motor drive system for a railway vehicle, capable of reducing the weight of wiring, electromagnetic noise, and manufacturing cost.

In order to accomplish the object, a first aspect of the present invention provides a motor drive system for a railway vehicle, having an inverter configured to control a motor and divided into at least two separate inverter units that are arranged integrally with the motor.

According to a second aspect of the present invention, the inverter units have direct-current ends connected in series.

According to a third aspect of the present invention, the inverter units have direct-current ends connected in parallel with a direct-current power source.

According to a fourth aspect of the present invention, the motor has multiphase windings whose number corresponds to the number of the inverter units arranged in parallel.

According to a fifth aspect of the present invention, the motor includes a fan that is attached to a shaft of the motor and is configured to generate cooling air, and each of the inverter units includes a heat radiation part arranged in a passage of the cooling air.

According to a sixth aspect of the present invention, the motor is a permanent-magnet motor having a sealed area inside a frame of the motor, and components of the inverter are arranged in the sealed area, to eliminate a switch for electrically disconnecting the inverter from the motor.

The inverter in the motor drive system for a railway vehicle according to the present invention employs switching elements of low withstand voltage. The low-withstand-voltage switching elements are mass-produced for, for example, hybrid electric cars and are inexpensive. The present invention arranges at least two such inverters to form a multiphase circuit that compensates for the low withstand voltage and low capacity and suppresses a current ripple. The present invention integrates the inverters with the motor, to reduce the weight of wiring, electromagnetic noise, and manufacturing cost.

DETAILED DESCRIPTION OF EMBODIMENTS

Embodiments of the present invention will be explained in detail with reference to the drawings.

First Embodiment

Figure 3:
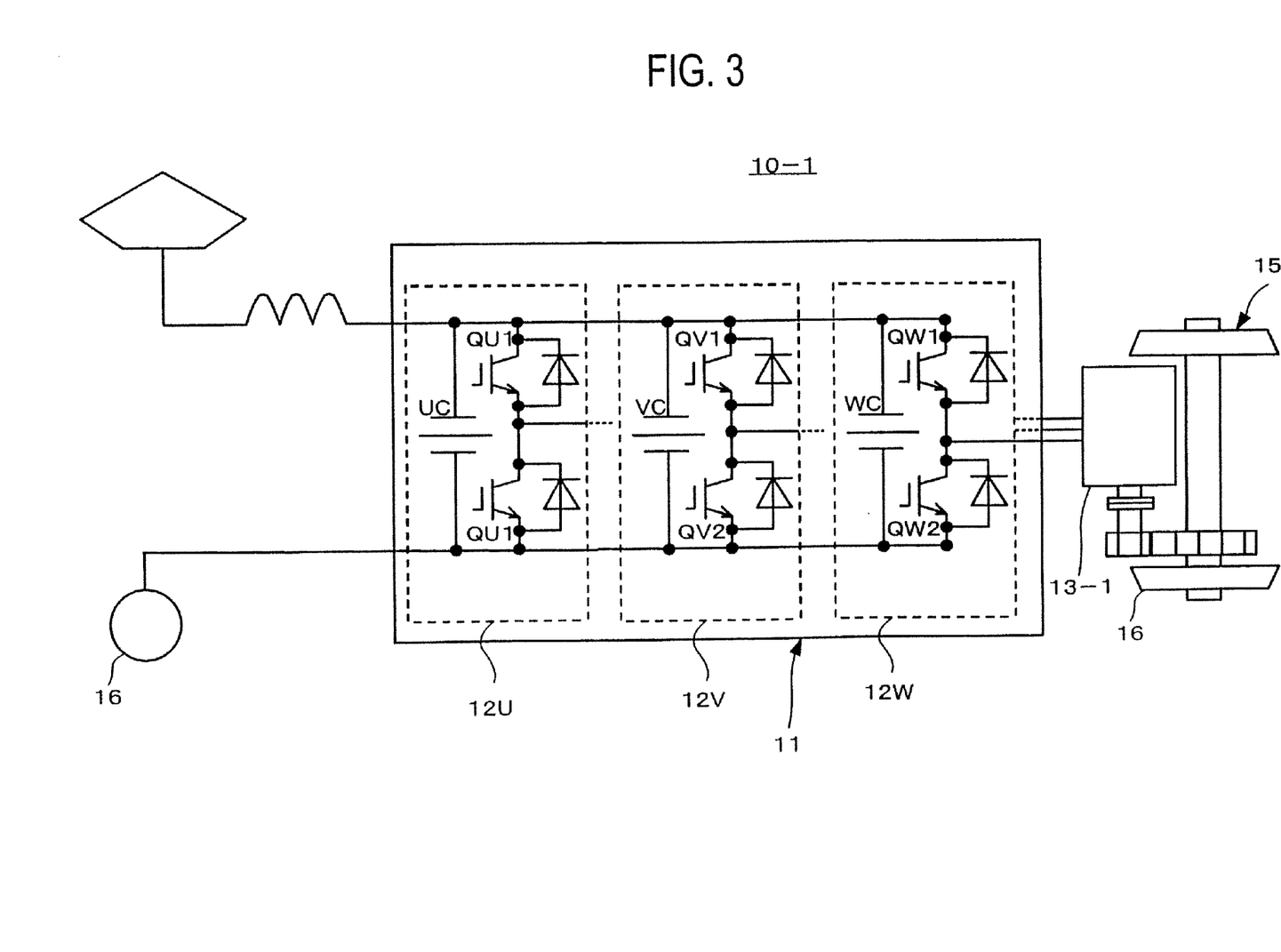
FIG. 3 is a circuit diagram showing a motor drive system for a railway vehicle according to a first embodiment of the present invention.

A motor drive system for a railway vehicle according to the first embodiment of the present invention will be explained with reference to FIGS. 3 to 5. The motor drive system 10-1 according to the first embodiment includes a three-phase inverter 11 and a three-phase, permanent-magnet synchronous motor 13-1. The inverter 11 includes a U-phase unit 12U having two pairs of U-phase switching elements, a V-phase unit 12V having two pairs of V-phase switching elements, and a W-phase unit 12W having two pairs of W-phase switching elements.

The U-phase unit 12U has two IGBTs (Insulated Gate Bipolar Transistors) QU1 and QU2 and a capacitor UC and forms an arm of the two-level inverter 11. Each of the V- and W-phase units 12V and 12W is similarly formed.

Figure 5:
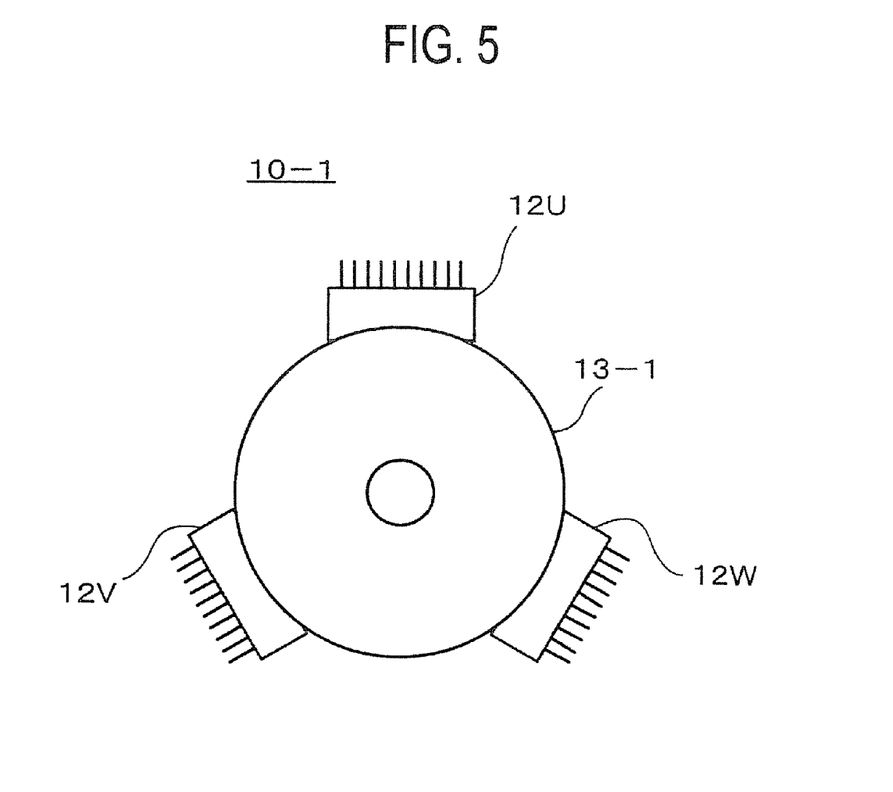
FIG. 5 is an explanatory view showing inverter phase units integrated with a motor in the motor drive system according to the first embodiment.

As shown in detail in FIG. 5, the U-, V-, and W-phase units 12U, 12V, and 12W are mechanically separated from one another and are arranged on the surface of the motor 13-1. As shown in detail in FIG. 3, direct-current parts of the U-, V-, and W-phase units 12U, 12V, and 12W are connected in parallel and alternating-current output ends thereof are connected to input ends of corresponding phases of the motor 13-1, like the three-phase inverter 110 of the related art shown in FIG. 1.

Figure 4:
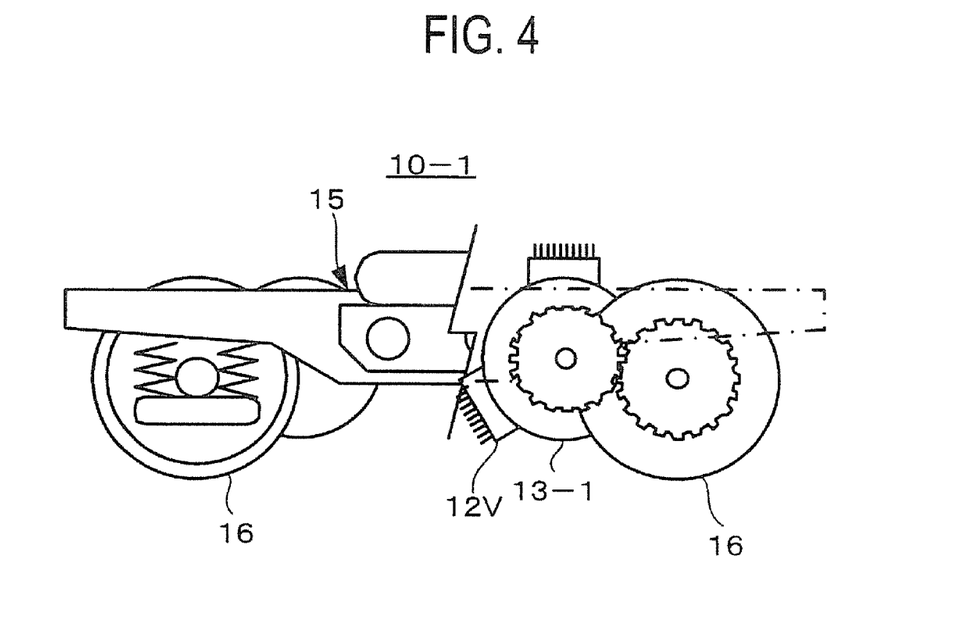
FIG. 4 is a view showing an arrangement of components of the motor drive system according to the first embodiment.

In FIG. 4, the phase units 12U, 12V, and 12W of the inverter 11 are integrated with the motor 13-1 and the integrated structure is arranged in a limited space in the vehicle 15 having a wheel 16.

According to the motor drive system 10-1 of the first embodiment, the three-phase inverter 11 is divided into the phase units 12U, 12V, and 12W that are arranged at, mechanically separated positions on the surface of the motor 13-1. This arrangement can avoid a concentration of heat generated by the inverter switching elements QU1, QU2, and the like and current conduction. This enables a heat radiation unit to be minimized, the integrated structure of the inverter 11 and motor 13-1 to be installed in a limited space in the vehicle 15, and an underfloor space 140 (FIG. 2) occupied by the conventional inverter 110 (FIG. 2) to be effectively utilized. In addition, three-phase wiring between the inverter 11 and the motor 13-1 is contained inside the motor 13-1, to reduce the weight of the wiring and eliminate electromagnetic noise that may cause malfunctions of railway signals.

Second Embodiment

A motor drive system for a railway vehicle according to the second embodiment of the present invention will be explained with reference to FIGS. 6 and 7. The motor drive system 10-2 of the second embodiment includes a first inverter 11-1, a second inverter 11-2, a third inverter 11-3, and a three-phase, three-winding, permanent-magnet synchronous motor 13-2.

Figure 6:
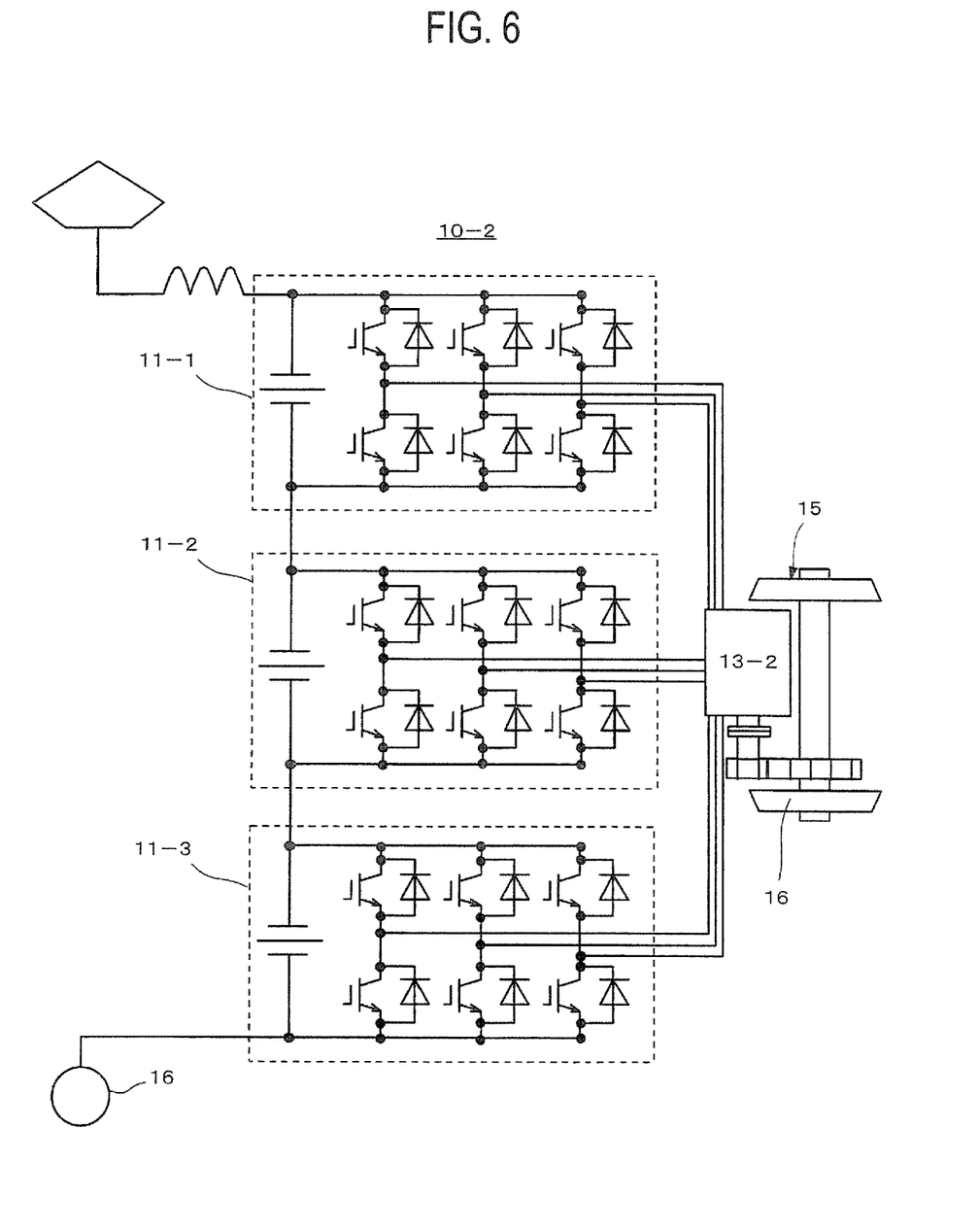
FIG. 6 is a circuit diagram showing a motor drive system for a railway vehicle according to a second embodiment of the present invention.

As shown in FIG. 6, the first inverter 11-1 is a two-level, full-bridge inverter having six IGBT switching elements and a capacitor. Generally, railway vehicles employ a DC voltage of 1500 V, and therefore, IGBTs each having a withstand voltage of 3300 V are usually adopted. On the contrary, the six IGBT switching elements employed by the second embodiment for each inverter are each of a withstand voltage of 1200 V. The IGBT switching elements of 1200-volt withstand voltage are widely available for, for example, hybrid electric cars, and therefore, are inexpensive. The second and third inverters 11-2 and 11-3 are constituted like the first inverter 11-1.

Direct-current ends of the first, second, and third inverters 11-1, 11-2, and 11-3 are connected in series to divide a voltage from an overhead line by three and receive the divided voltages, respectively. This configuration allows the IGBT elements of 1200-volt withstand voltage that are mass-produced and inexpensive to be used for the motor drive system 10-2 of the second embodiment.

Figure 7:
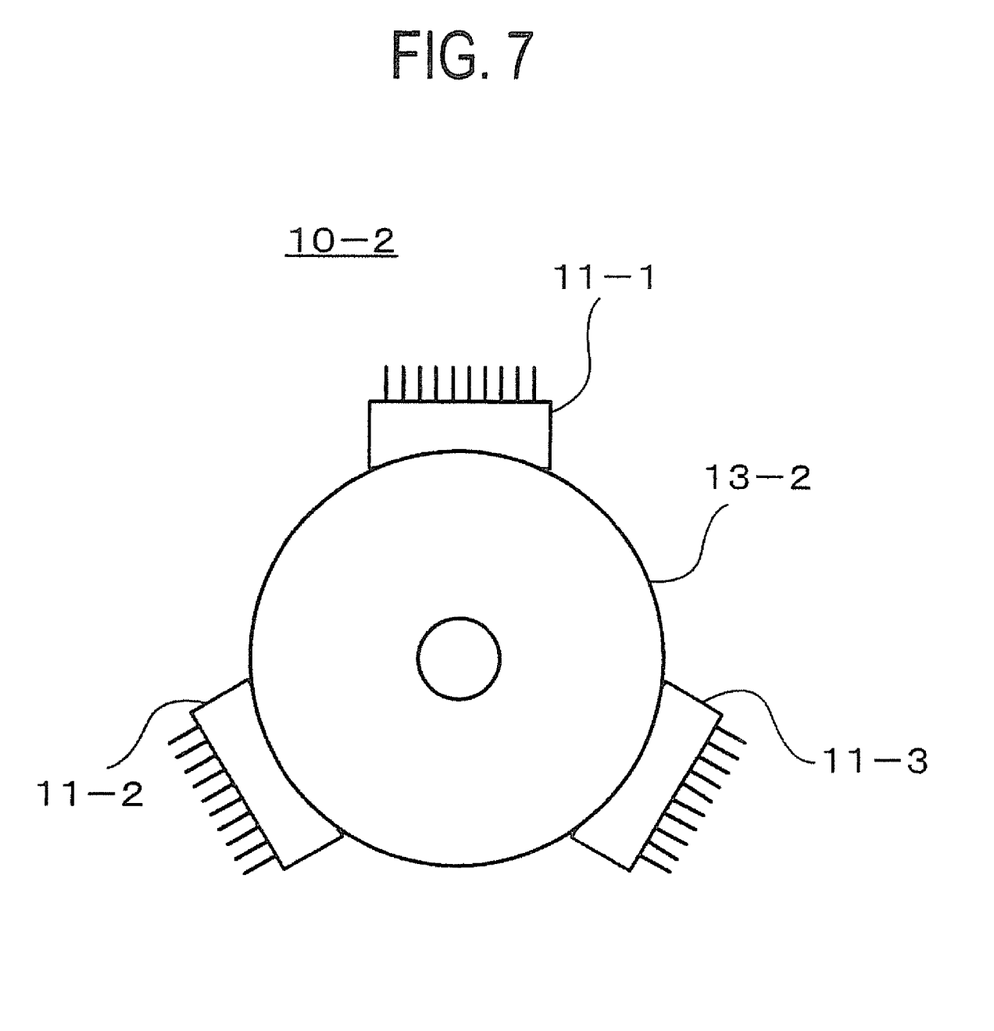
FIG. 7 is an explanatory view showing inverters integrated with a motor in the motor drive system according to the second embodiment.

As shown in detail in FIG. 7, the first, second, and third inverters 11-1, 11-2, and 11-3 are mechanically separated from one another and are arranged on the surface of the motor 13-2. Alternating-current output ends of the first, second, and third inverters 11-1, 11-2, and 11-3 are connected to U-, V-, and W-phase input terminals of the motor 13-2, respectively. The integrated structure of the inverters 11-1, 11-2, and 11-3 and motor 13-2 is installed in a limited space of the vehicle 15, like the first embodiment of FIG. 4.

According to the motor drive system 10-2 of the second embodiment, the first, second, and third inverters 11-1, 11-2, and 11-3 are arranged so that the direct-current sides of the inverters are connected in series with an overhead line to divide the voltage of the overhead line by three. The inverters 11-1, 11-2, and 11-3 are installed at mechanically separated positions on the surface of the motor 13-2, to avoid a concentration of heat generated by inverter switching and current conduction. This enables a heat radiation unit to be minimized, the integrated unit of the inverters and motor to be installed in a limited space in the vehicle 15, and an underfloor space 140 (FIG. 2) occupied by the conventional inverter 110 (FIG. 2) to be effectively utilized. In addition, three-phase multiplexed wiring between the inverters 11-1, 11-2, and 11-3 and the motor 13-2 is contained inside the motor 13-2, to reduce the weight of the wiring and eliminate electromagnetic noise that may cause malfunctions of railway signals. The second embodiment needs nine wires between the first, second, and third inverters 11-1, 11-2, and 11-3 and the motor 13-2. This, however, causes no increase in the quantity of wiring compared with the related art because the inverters and motor of the second embodiment are integrated into one, unlike the related art that arranges the inverter and motor at separate distant locations in a vehicle to necessitate long wiring. According to the second embodiment, the first, second, and third inverters are connected in series to divide an overhead-line voltage of 3300 V by three. Accordingly, the second embodiment can employ IGBT elements of 1200-volt withstand voltage for the inverters. The IGBT elements each having a withstand voltage of 1200 V that is relatively low are mass-produced, are inexpensive, and have higher reliability. Employing such IGBT elements results in improving the reliability of the motor drive system 10-2 and reducing the cost thereof.

Third Embodiment

A motor drive system for a railway vehicle according to the third embodiment of the present invention will be explained with reference to FIGS. 8 to 11.

Figure 8:
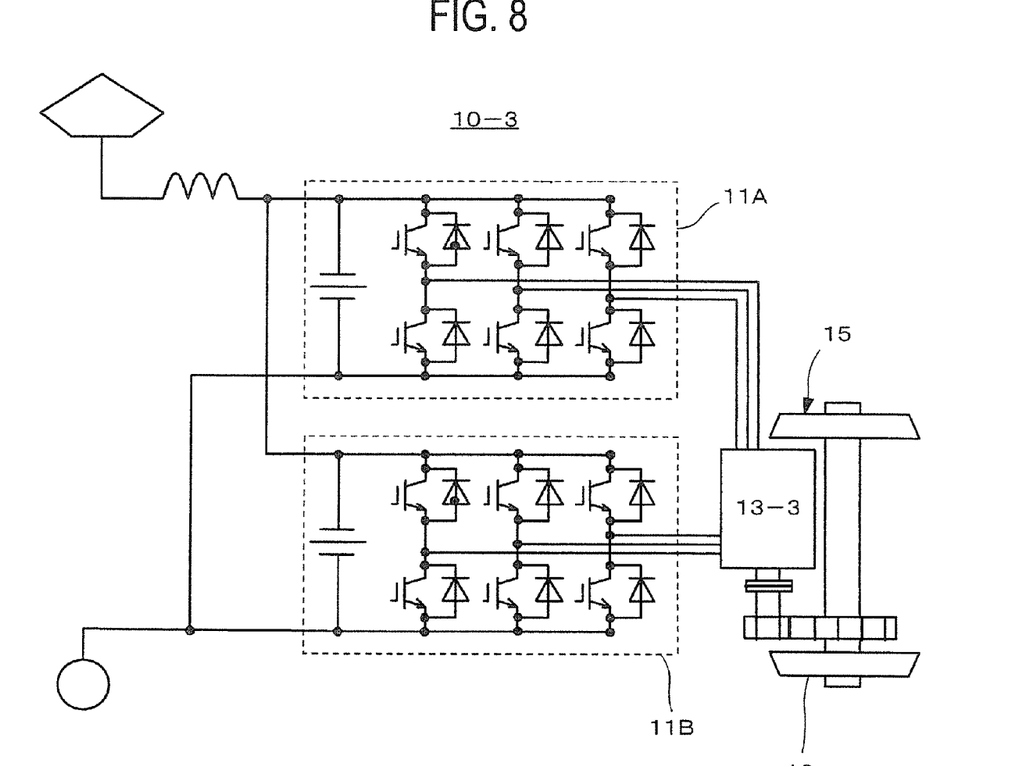
FIG. 8 is a circuit diagram showing a motor drive system for a railway vehicle according to a third embodiment of the present invention.

As shown in detail in FIG. 8, the motor drive system 10-3 of the third embodiment includes a first inverter 11A, a second inverter 11B, and a six-phase, permanent-magnet synchronous motor 13-3. The first inverter 11A is a two-level, full-bridge inverter having six IGBT switching elements and a capacitor. The second inverter 11B is constituted like the first inverter 11A. Direct-current ends of the first and second inverters 11A and 11B are connected in parallel, to receive a voltage from an overhead line.

Figure 9:
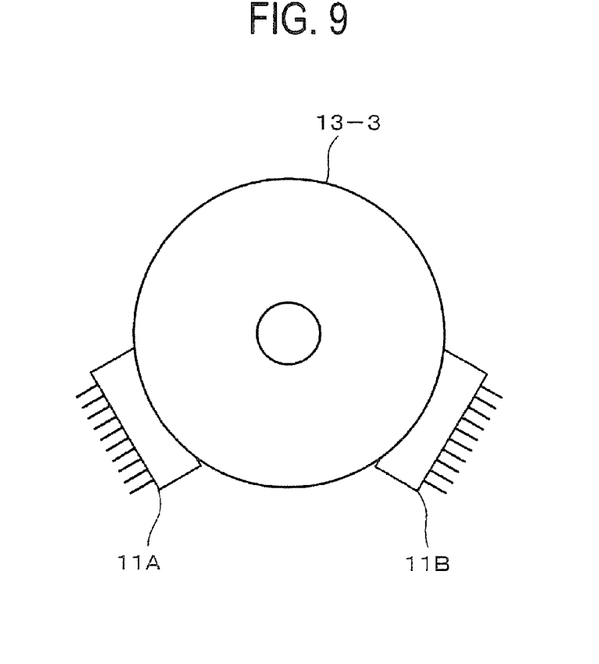
FIG. 9 is an explanatory view showing inverters integrated with a motor in the motor drive system according to the third embodiment.

As shown in detail in FIG. 9, the first and second inverters 11A and 11B are mechanically separated from each other and are arranged on the surface of the motor 13-3. Alternating-current output ends of each of the inverters 11A and 11B are connected to phase input terminals of the motor 13-3. The integrated structure of the inverters 11A and 11B and motor 13-3 is installed in a limited space in the vehicle 15, like the first embodiment shown in FIG. 4.

Figure 10:
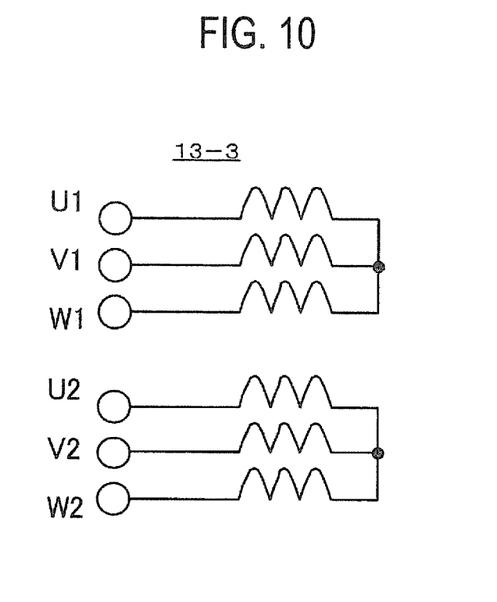
FIG. 10 is a circuit diagram showing wiring of the motor in the motor drive system according to the third embodiment.
Figure 11:
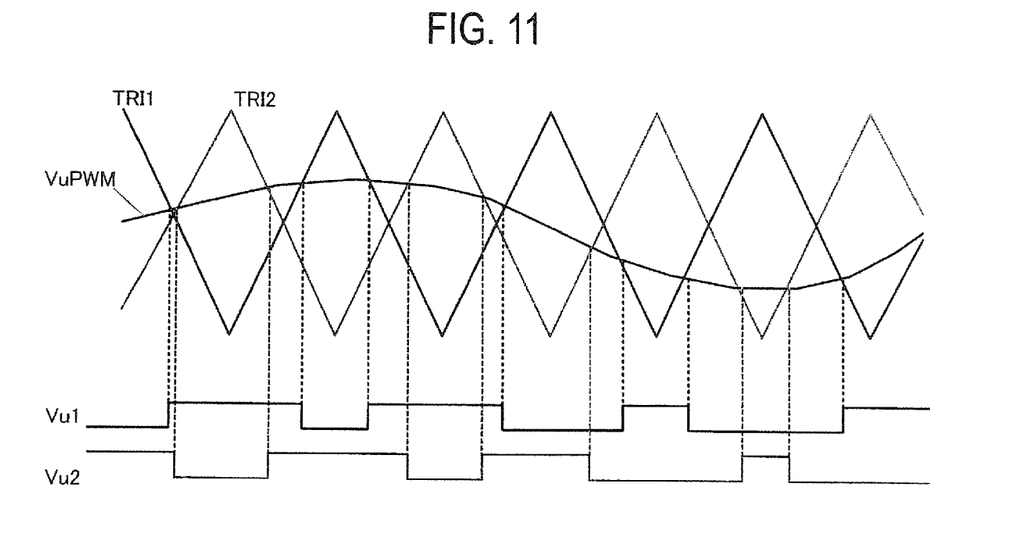
FIG. 11 is a view showing PWM switching patterns of the inverters in the motor drive system according to the third embodiment.

FIG. 10 shows wiring connections of the six-phase, permanent-magnet synchronous motor 13-3. The motor 13-3 includes two sets of three-phase windings whose neutral points are connected to each other. FIG. 11 shows switching timing of the first and second inverters 11A and 11B. The inverters 11A and 11B are synchronously controlled and the switching timing thereof is shifted by 180 degrees from each other to reduce motor current harmonics. This makes the motor 13-3 generate less heat and a heat radiation unit simplified. The simplified heat radiation unit makes the motor 13-3 downsized.

In this way, the motor drive system 10-3 according to the third embodiment divides an inverter into the first and second inverters 11A and 11B and arranges the divided inverters 11A and 11B at mechanically separated positions on the surface of the motor 13-3, to avoid a concentration of heat generated by inverter switching and current conduction and downsize a heat radiation unit of the motor drive system 10-3. The downsized motor drive system 10-3 can be installed in a limited space in the railway vehicle 15, to allow an underfloor space 140 (FIG. 2) occupied by the conventional inverter 110 (FIG. 2) to be effectively utilized. In addition, six-phase wiring between the inverters 11A and 11B and the motor 13-3 is contained inside the motor 13-3, to reduce the weight of the wiring and eliminate electromagnetic noise that may cause malfunctions of railway signals. Also, the third embodiment can reduce motor current harmonics, to make the motor 13-3 generate less heat, the heat radiation unit simplified, and the motor 13-3 downsized. The third embodiment needs six sets of wiring. The large number of wiring sets will be problematic if the inverters are installed away from the motor like the related art of FIG. 2. The third embodiment avoids such a problem by integrating the inverters with the motor.

Fourth Embodiment

Figure 12:
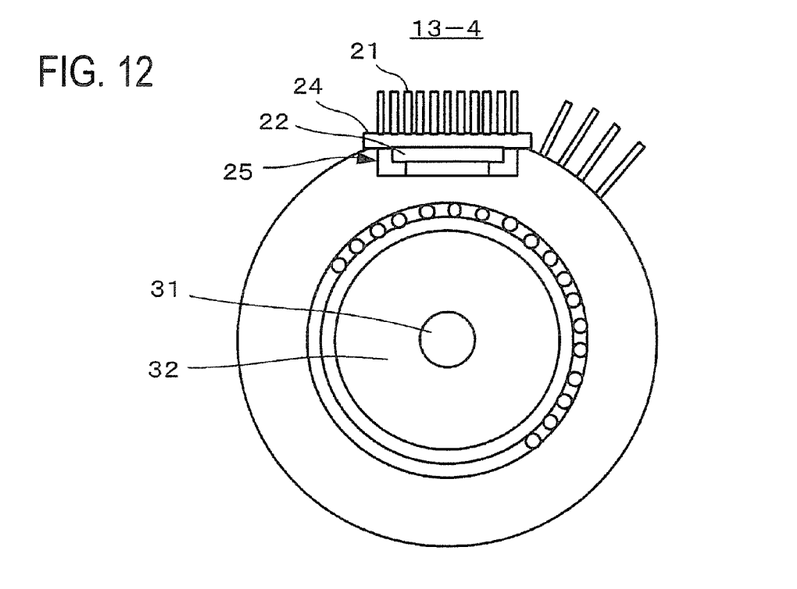
FIG. 12 is a side view showing an inverter U-phase unit integrated with a motor in a motor drive system for a railway vehicle according to a fourth embodiment of the present invention.
Figure 13:
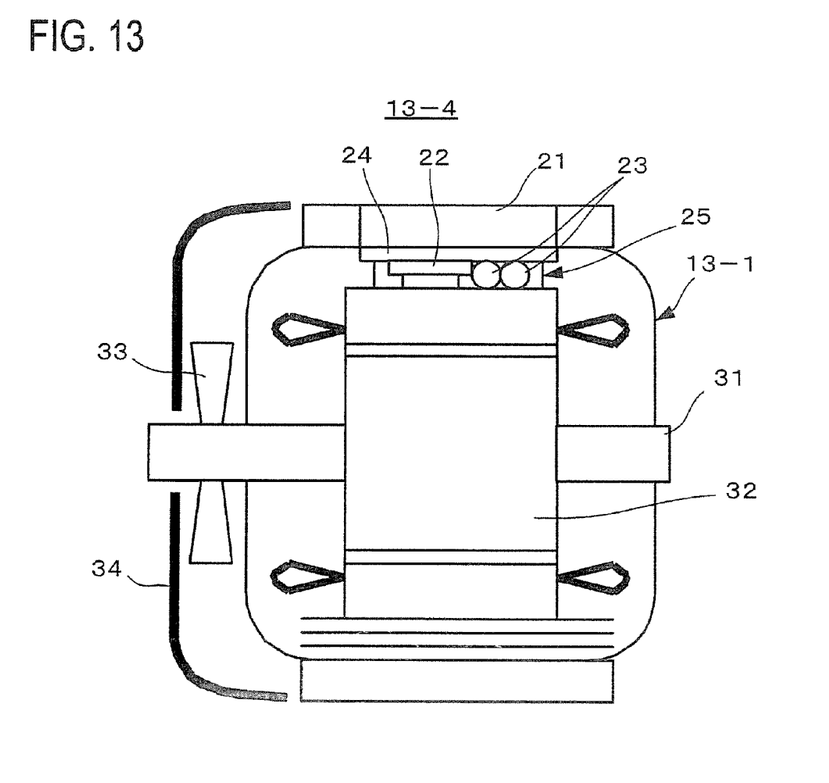
FIG. 13 is a front view showing the inverter U-phase unit integrated with the motor in the motor drive system according to the fourth embodiment.

A motor drive system for a railway vehicle according to the fourth embodiment of the present invention will be explained with reference to FIGS. 12 and 13. The motor drive system of the fourth embodiment has the same electric circuit configuration as that of the first embodiment shown in FIGS. 3 and 5. According to the fourth embodiment, an inverter 11 includes a U-phase unit 12U, a V-phase unit 12V, and a W-phase unit 12W each of which includes a cooling fin 21, an IGBT element 22, a capacitor 23, and a gate substrate 24 as shown in FIGS. 12 and 13. FIGS. 12 and 13 show only the U-phase unit 12U as a representative example. In FIGS. 12 and 13, the IGBT element 22, capacitor 23, and gate substrate 24 are electrically and mechanically connected to the cooling fin 21, to form the U-phase unit 12U. A motor 13-4 has a recess 25 in which the U-phase unit 12U is installed and fixed. At this time, the cooling fin 21 is on the surface side of the motor 13-4.

The motor 13-4 has a motor shaft 31 fixed to a rotor 32. The motor shaft 31 has a fan 33 that produces a wind when rotated. The motor 13-4 is provided with a guide 34 that guides the wind produced by the fan 33 along the surface of the motor 13-4 to efficiently radiate heat from the cooling fin 21 of the inverter 11. The IGBT element 22, capacitor 23, gate substrate 24, and the like are enclosed in a closed space between the cooling fin 21 and the motor 13-4.

The fourth embodiment eliminates a motor disconnection switch the related art must employ for a permanent-magnet synchronous motor for a railway vehicle, to avoid overheat and fire when an IGBT element is short-circuited to pass a short-circuit current due to an induced voltage under no motor load.

What is claimed is:
1. A motor drive system for a railway vehicle, comprising:
a motor to be controlled;
a motor shaft fixed to a center of the motor;
a motor frame surrounding an outer surface of the motor, and including a plurality of sealed areas therein;
an inverter configured to control the motor and that is divided into at least two mechanically separate inverter units, each inverter unit being arranged in a respective of the sealed areas inside of the motor frame;
a plurality of cooling fins, each cooling fin being fixed on an outer side of the separated inverter units to face outside;
a cooling fan fixed at an end of the motor shaft outside of the motor frame to rotate with the motor shaft; and
a cooling air guide arranged at an outside of the motor frame so as to guide a cooling air from the cooling fan along an outer surface of the motor frame to each cooling fin.
2. The motor drive system of claim 1, wherein:
the motor is a permanent-magnet motor.

* * * * *